United States Patent [19]
Bonow

[11] Patent Number: 5,960,686
[45] Date of Patent: Oct. 5, 1999

[54] ALIGNMENT PIN FOR TUBE SQUARING MACHINE

[75] Inventor: William Bonow, Plainfield, Ill.

[73] Assignee: The E. H. Wachs Company, Wheeling, Ill.

[21] Appl. No.: 08/880,779

[22] Filed: Jun. 23, 1997

[51] Int. Cl.[6] ............................................. B23B 3/00
[52] U.S. Cl. ................. 82/1.11; 33/201; 33/637; 33/645; 82/113; 408/106; 408/241 R
[58] Field of Search .................. 82/113, 1.11; 408/104, 408/105, 106, 107, 241 R, 1 R; 33/201, 626, 628, 634, 633, 635, 636, 637, 642, 640, 645

[56] References Cited

U.S. PATENT DOCUMENTS

| 4,553,334 | 11/1985 | Fell | 33/628 |
| 4,837,941 | 6/1989 | Mulilns | 33/638 |
| 5,619,893 | 4/1997 | Pierce | 82/113 |

*Primary Examiner*—Daniel W. Howell
*Assistant Examiner*—Monica Smith
*Attorney, Agent, or Firm*—Robert L. Marsh

[57] ABSTRACT

An alignment pin has a first cylindrical portion having a first diameter equal to the outer diameter of a work piece, and axially aligned therewith is a second cylindrical portion having a second diameter equal to the inner diameter of a work piece. The pin is inserted into a tube squaring machine to align the cutting tool of the machine for squaring a work piece having outer and inner diameters equal to the first and second diameters of the pin.

2 Claims, 2 Drawing Sheets

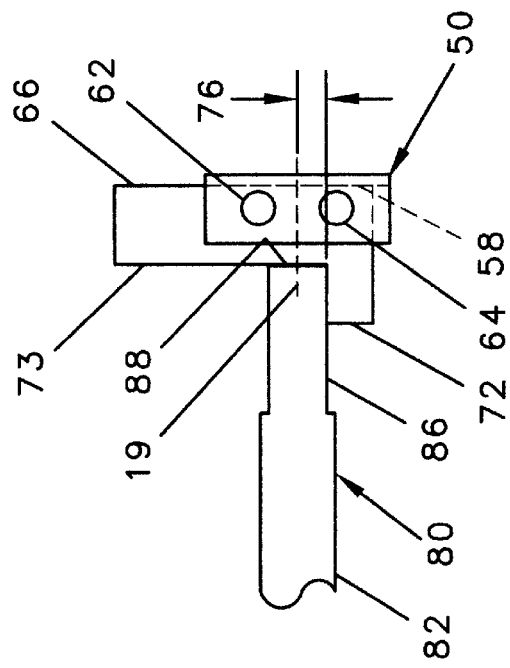
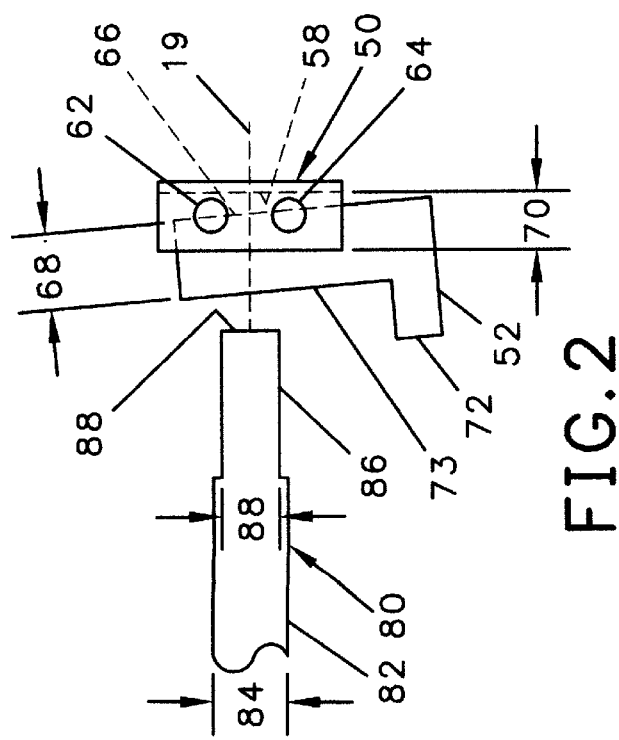
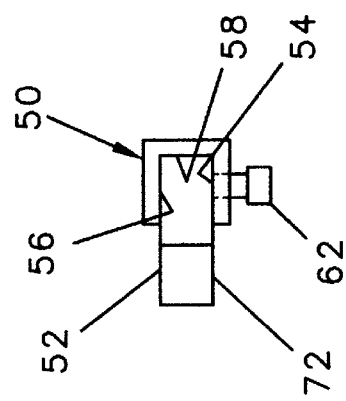

ALIGNMENT PIN FOR TUBE SQUARING MACHINE

The present invention relates to machines for squaring the ends of tubes, and in particular to a pin for use in cooperation with such machines to align the tool used in such machines.

BACKGROUND OF THE INVENTION

Tube squaring machines include a housing with a drive assembly for axially moving a rotating drive shaft, and positioned forward of the distal end of the drive shaft is a collet for retaining the distal end of a length of cylindrical tubing. At the distal end of the rotating shaft is a retainer into which the cutting tool is inserted and is locked in position. The cutting tool has a cutting portion which must be radially aligned within the retainer so that the cutting portion of the tool will cut the metallic portions of the tube retained in the collet as the shaft rotates.

When the same machine is used to square a tubing having a second diameter, the collet for the first diameter of tubing is removed and the collet for the second diameter of tubing is inserted into the collet retainer. Thereafter, the cutting tool must be loosened within the retainer and radially adjusted so that the cutting portion of the tool is aligned to cut the metal of the second diameter of tubing.

Two factors relate to the alignment of a cutting tool in the retainer of a tube squaring machine. First, the cutting portion of the tool must be radially positioned with respect to the axis of the shaft such that it will engage the metallic portions of the tubing the end of which is to be squared. Second, the cutting tool must be squarely bottomed against the inner surfaces of the retainer so that the cutting tool will cut a planar surface on the distal end of a length of tubing retained in the collet. If the cutting tool is not squarely bottomed within the retainer, the surface cut by the cutting tool will be somewhat frustoconical, and not square as is desired.

Presently, a technician must visually inspect the position of a cutting tool within the retainer to determine that it is bottomed within the retainer, and that the cutting portion is radially positioned to engage the metal of the tubing to be squared. When the technician is satisfied that the cutting tool is properly positioned, he will tighten the set screws of the retainer to lock the cutting tool into position.

SUMMARY OF THE INVENTION

Briefly, the present invention is usable with a tube squaring machine having an axially movable rotating shaft with the retainer at the end thereof for retaining the cutting tool. The squaring machine further has a collet retainer into which a collet is inserted for retaining a cylindrical work piece. The collet retainer is positioned to retain a cylindrical work piece having an outer diameter of a first given dimension, and an inner diameter of a second given dimension, in axial alignment with the longitudinal axis of the rotating shaft. The distal end of the work piece can then be engaged by a tool retained in the retainer.

An alignment pin in accordance with the present invention has a first cylindrical portion having a first diameter equal to the first given dimension, and axially aligned therewith is a second cylindrical portion having a second diameter equal to the second given dimension. To align the cutting tool within the retainer of a tube squaring machine, the collet having an inner diameter equal to the first dimension and, therefore, suitable for retaining a work piece of the desired diameter is inserted into the collet retainer. A cutting tool is loosely inserted into the tool retainer such that the tool can be positioned with respect to the retainer. The axially movable shaft is withdrawn into the housing and away from the collet. Thereafter, the alignment pin in accordance with the present invention is inserted into the collet with the distal end of the second portion thereof abutting against the tool to be aligned within the retainer. Next, the collet is tightened around the pin such that the pin is locked within the collet against axial movement therein. Thereafter, the technician will axially advance the rotatable shaft and the tool retainer at the distal end thereof so that the distal end of the pin will force the cutting tool to become bottomed within the retainer. Finally, the technician will radially slide the cutting tool within the retainer until the cutting portion thereof abuts against the cylindrical wall of the first portion of the pin and he will tighten the retainer around the tool to lock it in place. Once the tool is locked in place, the collet can be loosened and the pin removed. When a work piece is subsequently inserted into the collet and locked into position, the cutting tool will be aligned to cut a square distal end on the work piece therein.

BRIEF DESCRIPTION OF THE DRAWING

A better understanding of the present invention will be had by a reading of the detailed description taken in conjunction with the following drawings wherein:

FIG. 2 is a fragmentary enlarged side view of the tool retainer, the tool, as shown in FIG. 1, and an alignment pin in accordance with the present invention with the tool improperly aligned, and portions of the tool retainer and the tool shown in phantom lines;

FIG. 3 is a fragmentary enlarged side view of the tool retainer and the tool, as shown in FIG. 1, and the alignment pin in accordance with the present invention, with the tool properly aligned, and portions of the tool retainer and tool shown in phantom lines; and FIG. 4 is an enlarged end view of the tool holder with a tool retainer therein as shown in FIG. 3.

DETAILED DESCRIPTION OF THE PREFERRED EMBODIMENT

Figure 1:
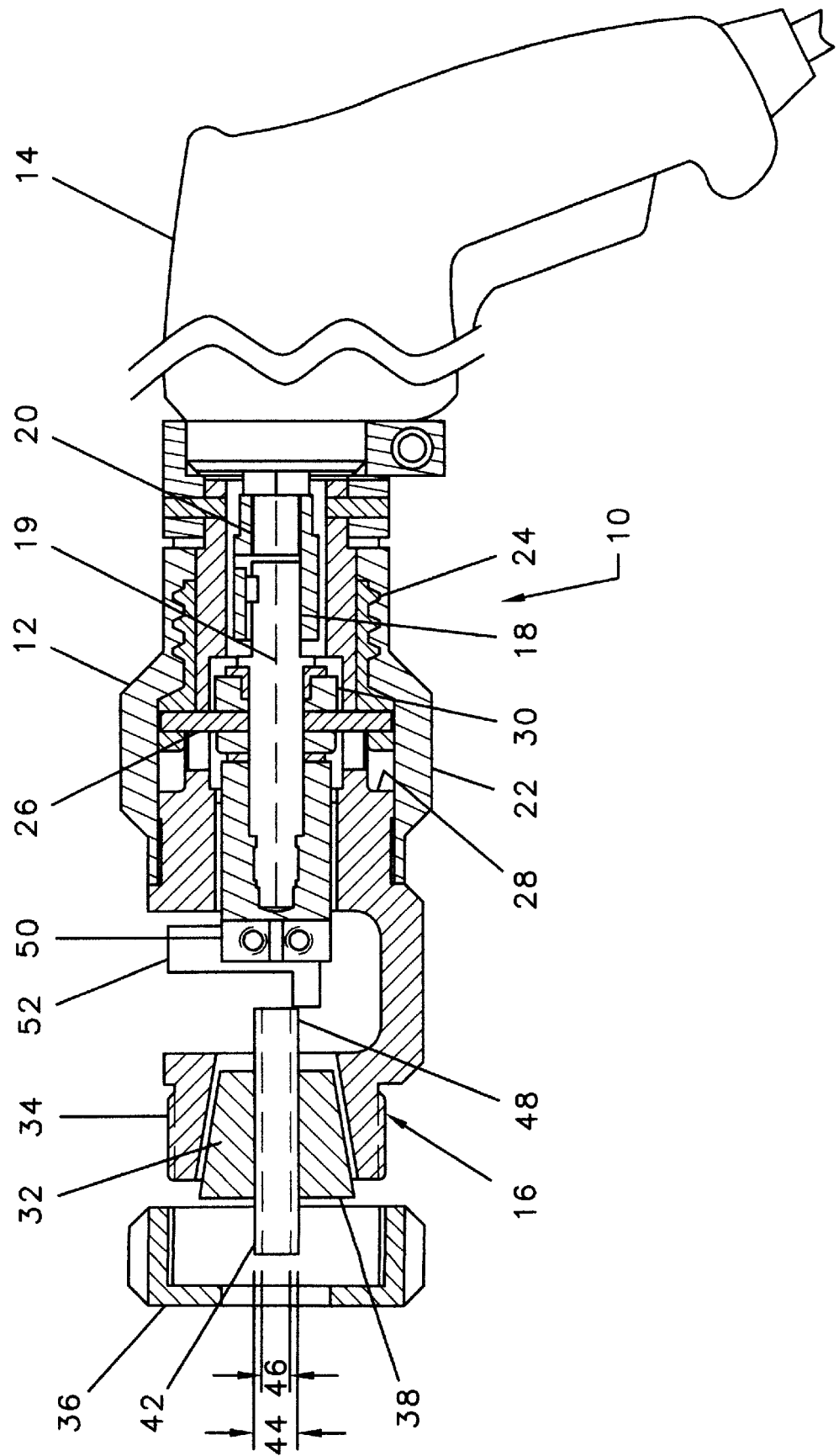
FIG. 1 is a cross-sectional view of a tube squaring machine having a work piece retained in the collet thereof.

Referring to FIG. 1, a tube squaring machine 10 has a housing 12 at one end of which is a motor 14, and at the opposite end of which is a collet retainer 16. Within the housing 12 is an axially movable rotatable shaft 18 having an axis 19 which is drivingly connected by splines 20 or the like to the drive shaft of the motor 14. Fitted around the circumference of the housing 12 is a rotatable thrust nut 22 which threadedly engages a non-rotatable but axially movable thrust screw 24. A pin 26 extends through a slot 28 in the housing 12 to connect the thrust screw 24 to an inner thrust sleeve 30. Rotation of the thrust nut 22 will, therefore, cause axial movement of the thrust screw 24 and thrust sleeve 30 and thereby axially move the rotatable shaft 18 between an extended position and a retracted position.

The collet retainer 16 has a frustoconical inner surface 32 and a threaded outer surface 34 for receiving a collet retaining nut 36. Fitted within the frustoconical interior of the collet retainer is a frustoconical collet 38 having an inner opening sized to receive a tubular work piece 42 having a first outer diameter 44 and a second inner diameter 46. Adjacent the distal end 48 of the work piece 42 is a tool retainer 50 fitted on the distal end of the shaft 18 for retaining a tool 52.

As shown in FIGS. 2, 3 and 4, the tool 52 is retained in a transverse slot in the tool retainer 50 defined by parallel first and second walls 54, 56 and a rear surface 58 which is perpendicular to the axis 19 of the shaft 18. Extending through the first wall 54 are a pair of set screws 62, 64 for locking the tool 52 in the retainer 50.

The tool 52 has a rectangular body with a thickness sized to slideably fit between the first and second walls 54, 56, and a rear surface 66 adapted to abut against the rear surface 58 of the tool retainer 50. The tool 52 has a length 68 which is greater than the depth 70 of the walls 54, 56 such that the forward end 73 of the tool 52 extends beyond the forward end of the tool retainer 50. At one end of the tool 52 is a cutting tooth 72, and the forward cutting edge of the tooth is parallel to the rear surface 66. The cutting tooth 72 has a width which is wider than the thickness of the thickest wall of a work piece 42 to be squared by the machine.

As best shown in FIG. 3, when the tool 52 is properly inserted into the tool retainer 50, the rear surface 66 thereof will abut against the rear surface 58 of the retainer, and the inner edge of the tooth 72 will be radially spaced a distance 76 from the axis 19 of the shaft 18 which is equal to half of the inner diameter 46 of the work piece 42. When the tool 52 is properly aligned within the tool retainer 50, the technician can tighten the set screw 62, 64 to retain the tool in proper alignment.

An improperly aligned tool is shown in FIG. 3. To assist in the alignment of the tool within the retainer, an alignment pin 80 in accordance with the present invention is provided. The pin 80 has a first cylindrical portion 82 having a first diameter 84 which is equal to the outer diameter 44 of a work piece 42 which is to be retained by a collet 38. Axially aligned with the first portion 82 is a second cylindrical portion 86 having a second diameter 88 which is equal to the inner diameter 46 of the work piece 42.

To align a tool 52 within a tool retainer 50 of the squaring machine 10 such that it will make a square cut across the distal end of a work piece 42, the collet 38 sized to receive the the work piece 42 is inserted into the collet retainer 16. The tool 52 is fitted into the retainer 50 with the set screws 62, 64 withdrawn such that the tool 52 is movable therein. The screw 24 of the machine 10 is rotated to withdraw the shaft 18 such that it is retracted away from the collet 38. Thereafter, the pin 80 having a first diameter 84 equal to the outer diameter 44 of the work piece 42 and a second diameter 88 equal to the inner diameter 46 thereof is inserted into the collet until the distal end 88 thereof abuts against the forward end 73 of the tool 52. The collet is then tightened to lock the pin 80 against axial movement within the collet 38. Next, the tool 52 is moved transversely within the slot defined by the first and second walls 52, 56 until the inner surface of the tooth 72 abuts against the outer surface of the second portion 86 of the pin 80. Then, the thrust screw 24 is rotated to forwardly advance the shaft 18 towards the collet retainer 16. As the shaft 18 advances towards the pin 80, the tool 52 will be forced rearward into the tool holder by the distal end 88 of the pin 80. The shaft 18 will only move forward until the rear surface 66 of the tool 52 abuts against the rear surface 58 of the tool retainer 50 and the tool will then be bottomed within the retainer. The technician can then tighten the set screws 62, 64 thereby locking the tool in proper alignment for cutting the work piece 52. The collet 38 can then be loosened, and the pin 80 withdrawn. Finally, the distal end of the work piece 42 inserted is in the collet and secured where it can be engaged by the tool 72 of the tool 50.

Typically, a tube squaring machine will be adapted to square the ends of a number of sizes to tubings. For example, the same machine may square tubings having outer diameters of ⅛ inch, ¼ inch, ⅜ inch, ½ inch, and perhaps larger. In accordance with the present invention, a pin 80 is provided for each size of tubing to be squared by the machine 10 and accordingly a number of sizes of pins 80 may be used in conjunction with a single tube squaring machine 10 with each pin corresponding to one of the sizes of tubings which the machine can accept.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. The method of aligning a tool in a machine for working a tubular work piece having a given outer diameter and a given inner diameter, said machine having an axially movable shaft with a tool retainer at one end thereof, said tool retainer having releasable means for locking a tool in said tool retainer, and means for retaining said tubular work piece in axial alignment with said shaft, the method comprising, providing an alignment pin having a first cylindrical portion having an outer diameter substantially equal to said given outer diameter and a second cylindrical portion having an outer diameter substantially equal to said given inner diameter, retaining said alignment pin in said means for retaining with said second cylindrical portion extending towards said tool retainer, inserting a tool in said tool retainer with said means for retaining in a release condition, axially moving said shaft and said tool retainer toward said means for retaining until said tool is bottomed in said tool retainer, and locking said tool in said tool retainer.

2. The method of claim 1 and wherein said tool has a tooth with an inner end, the method further comprising the step of, sliding said tool in said tool retainer until said inner end of said tool abuts said second cylindrical portion before locking said tool in said tool retainer.

* * * * *